(12) United States Patent
Marshall et al.

(10) Patent No.: US 11,885,445 B2
(45) Date of Patent: Jan. 30, 2024

(54) MODULAR DUCT CONNECTION AND SEAL

(71) Applicant: Honda Motor Co., Ltd., Tokyo (JP)

(72) Inventors: Stephen James Marshall, Columbus, OH (US); Steve Faria, Marysville, OH (US); Taiga Marukawa, Rochester Hills, MI (US); Patrick J. Ellison, Dublin, OH (US); Takashi Nakano, Columbus, OH (US); Akira Futatsuhashi, Wako (JP); Keiichiro Tsuji, Novi, MI (US)

(73) Assignee: HONDA MOTOR CO., LTD., Tokyo (JP)

( * ) Notice: Subject to any disclaimer, the term of this patent is extended or adjusted under 35 U.S.C. 154(b) by 122 days.

(21) Appl. No.: 17/688,060

(22) Filed: Mar. 7, 2022

(65) Prior Publication Data

US 2023/0279977 A1 Sep. 7, 2023

(51) Int. Cl.
*F16L 23/024* (2006.01)
*F02M 35/10* (2006.01)

(52) U.S. Cl.
CPC ..... *F16L 23/024* (2013.01); *F02M 35/10144* (2013.01)

(58) Field of Classification Search
CPC ... F16L 23/024; F16L 23/028; F16L 23/0283; F16L 23/16; F02M 35/10144
See application file for complete search history.

(56) References Cited

U.S. PATENT DOCUMENTS

| | | | |
|---|---|---|---|
| 2,294,036 A | 8/1942 | Kettering | |
| 6,405,977 B1 | 6/2002 | Ash et al. | |
| 7,055,335 B2 | 6/2006 | van Leeuwen | |
| 7,096,925 B2 | 8/2006 | Bracciano | |
| 7,484,794 B2 | 2/2009 | Loup et al. | |
| 7,955,167 B2 | 6/2011 | Walterscheid et al. | |
| 9,139,071 B2 | 9/2015 | Lummitsch et al. | |
| 9,505,300 B2 | 11/2016 | Grasso et al. | |
| 10,000,105 B2 * | 6/2018 | Barrow | B60H 1/3421 |
| 2011/0005271 A1 | 1/2011 | Seto et al. | |

(Continued)

FOREIGN PATENT DOCUMENTS

| | | |
|---|---|---|
| CN | 203611684 | 5/2014 |
| CN | 110641495 | 1/2020 |
| CN | 209904480 | 1/2020 |

(Continued)

*Primary Examiner* — Jacob M Amick
(74) *Attorney, Agent, or Firm* — Mark E. Duell; RANKIN, HILL & CLARK LLP

(57) ABSTRACT

A duct system for an air intake system for a vehicle, the duct system including a first duct having a first duct wall that defines a first duct opening and forms a conduit configured for conveying fluid through the first duct opening in an axial direction of the first duct opening, and a rim fixed with the first duct wall and extending from the first duct in the axial direction of the first duct opening, and disposed around the first duct opening, with a first rim portion and a second rim portion disposed along opposite sides of the first duct opening in a lateral direction of the first duct opening perpendicular to the axial direction of the first duct opening. The duct system also includes a second duct including a second duct wall that defines a second duct opening in fluid communication with the first duct opening.

20 Claims, 13 Drawing Sheets

(56) References Cited

U.S. PATENT DOCUMENTS

2016/0186702 A1\* 6/2016 Rother ............. F02M 35/10144
123/434

FOREIGN PATENT DOCUMENTS

| CN | 210970590 | 7/2020 |
| CN | 211107193 | 7/2020 |
| CN | 212604375 | 2/2021 |
| DE | 102006009162 | 11/2006 |
| EP | 1531069 | 5/2005 |
| JP | 4888240 | 2/2012 |
| JP | 4947542 | 6/2012 |
| KR | 20030075709 | 9/2003 |
| WO | 2011038571 | 4/2011 |
| WO | 2012160020 | 11/2012 |

\* cited by examiner

MODULAR DUCT CONNECTION AND SEAL

BACKGROUND

Known duct systems feature modular ductwork and require sealed connections between duct system components configured for conveying fluid therethrough. When known modular duct system components are installed in fluid communication with each other, however, an installation direction between the duct system components is not aligned with a sealing direction between the duct system components, causing sealing surfaces between the duct system components, and any sealing elements disposed between the sealing surfaces to experience a shear force. As a result, sealing interfaces between duct system components often produce holes or experience warping, cracking, or other damage that reduces seal quality between the duct system components. Consequently, there is a need for a duct system featuring modular components assembled in an installation direction aligned with a seal direction.

BRIEF DESCRIPTION

According to one aspect, a duct system for an air intake system for a vehicle, the duct system including a first duct having a first duct wall that defines a first duct opening and forms a conduit configured for conveying fluid through the first duct opening in an axial direction of the first duct opening, and a rim fixed with the first duct wall and extending from the first duct in the axial direction of the first duct opening, and disposed around the first duct opening, with a first rim portion and a second rim portion disposed along opposite sides of the first duct opening in a lateral direction of the first duct opening perpendicular to the axial direction of the first duct opening. The duct system also includes a second duct including a second duct wall that defines a second duct opening in fluid communication with the first duct opening, and forms a conduit configured for conveying fluid through the second duct opening, where when the second duct is installed on the first duct in an installation direction along the lateral direction of the first duct opening, the second duct wall engages the first rim portion such that the rim obstructs movement of the second duct in the installation direction, and extends over the second rim portion.

According to another aspect, a duct system for an air intake system for a vehicle includes a first duct and a second duct. The first duct includes a first duct wall that defines a first duct opening and forms a conduit configured for conveying fluid through the first duct opening in an axial direction of the first duct opening. A first contact surface is provided on an outer surface of the first duct wall, and a second contact surface is provided on an inner surface of the first duct wall and located at a side of the first duct wall opposite the first contact surface, across the first duct opening in a lateral direction of the first duct opening perpendicular to the axial direction of the first duct opening. The second duct includes a second duct wall that defines a second duct opening in fluid communication with the first duct opening, and forms a conduit configured for conveying fluid through the second duct opening. The first contact surface and the second contact surface are positioned offset from each other in the axial direction of the first duct opening such that when the second duct is installed on the first duct along the lateral direction of the first duct opening, the first contact surface and the second contact surface engage with and seal against the second duct wall.

According to another aspect, a duct system for an air intake system for a vehicle includes a first duct and a second duct. The first duct includes a first duct wall that forms a rim defining a first duct opening, and forms a conduit configured for conveying fluid through the first duct opening in an axial direction of the first duct opening. The first duct also includes a first contact surface provided on an outer surface of the rim, and a second contact surface provided on an inner surface of the rim and located at a side of the first duct wall opposite the first contact surface, across the first duct opening in a lateral direction of the first duct opening perpendicular to the axial direction of the first duct opening. The second duct includes a second duct wall that defines a second duct opening in fluid communication with the first duct opening, and forms a conduit configured for conveying fluid through the second duct opening. The rim at the first contact surface terminates behind the rim at the second contact surface with respect to the axial direction of the first duct opening from the first duct toward the second duct such that when the second duct is installed on the first duct along the lateral direction of the first duct opening, the first contact surface and the second contact surface engage with and seal against the second duct wall.

DETAILED DESCRIPTION

Figure 1:
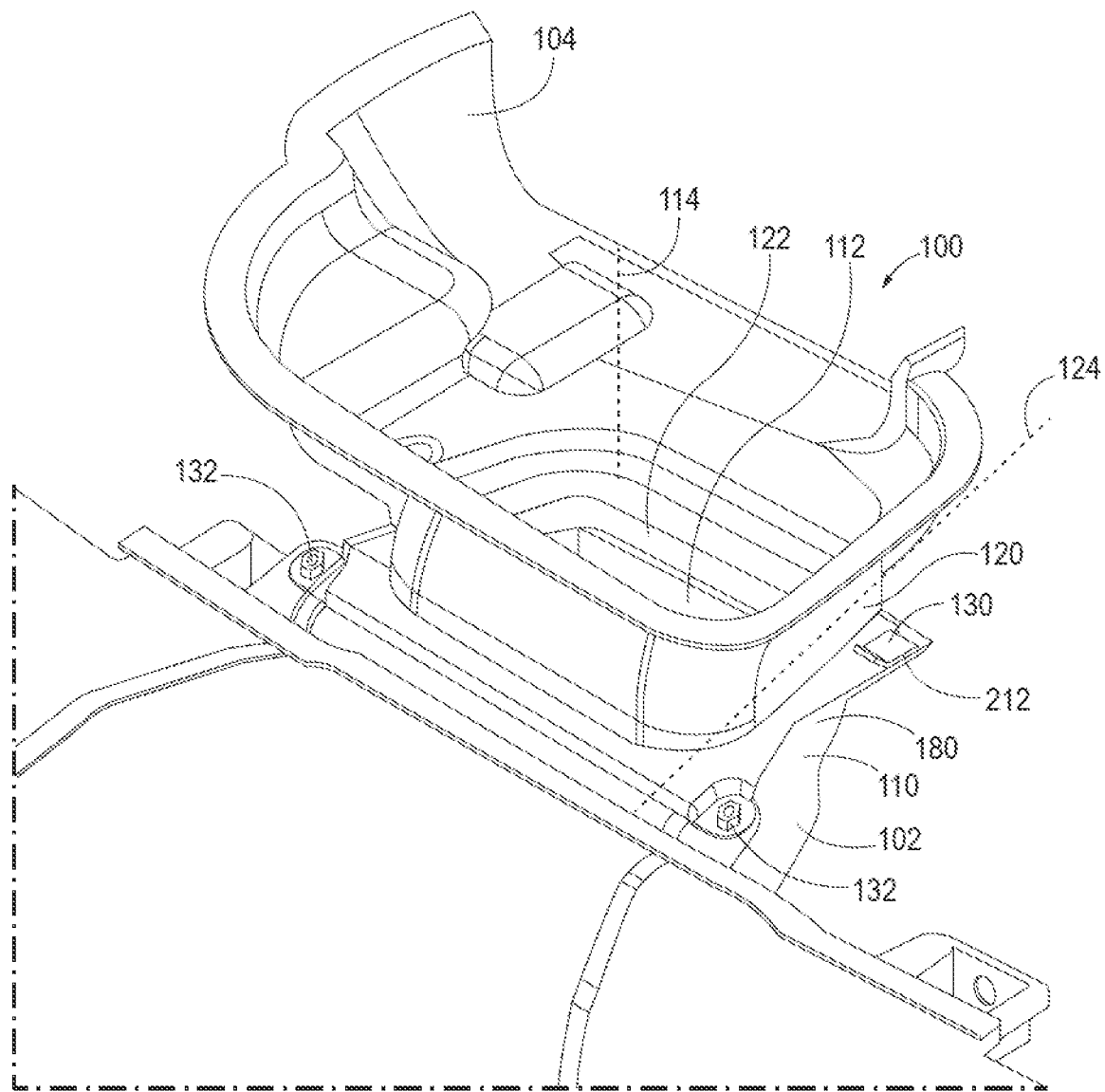
FIG. 1 is a partial perspective view of a duct system according to one aspect of the present disclosure.

It should, of course, be understood that the description and drawings herein are merely illustrative and that various modifications and changes can be made in the structures disclosed without departing from the present disclosure. Referring now to the drawings, wherein like numerals refer to like parts throughout the several views, FIG. 1 depicts a duct system 100 including a first duct 102 fixed in fluid communication with a second duct 104. The first duct 102 includes a first duct wall 110 that defines a first duct opening 112 and forms a conduit configured for conveying fluid through the first duct opening 112 in an axial direction of the first duct opening 112 indicated by an axis 114. The second duct 104 includes a second duct wall 120 that defines a second duct opening 122 in fluid communication with the first duct opening 112, and forms a conduit configured for conveying fluid through the second duct opening 122.

The first duct 102 and the second duct 104 are sealed in fluid communication through the first duct opening 112 and the second duct opening 122 by installing the second duct 104 on the first duct 102 along a lateral direction of the first duct opening 112 perpendicular to the axial direction 114 of the first duct opening 112, indicated by an axis 124. In the depicted embodiment, the duct system 100 is part of an air intake system for a vehicle (not shown) where the axial direction 114 of the first duct opening 112 is oriented along a height direction of the vehicle, and the second duct 104 is installed on the first duct 102 along the lateral direction 124 of the first duct opening 112, perpendicular to the height direction of the vehicle.

When the second duct 104 is installed on the first duct 102, the second duct 104 is removably pressed on the first duct 102 in an installation direction oriented along the lateral direction of the first duct opening 112. The first duct 102 includes a tab 130 extended from the first duct wall 110. The tab 130 is configured to obstruct movement of the second duct 104 in the installation direction of the second duct 104, and press the second duct 104 against the first duct 102 in the axial direction 114 of the first duct opening 112, sealing the first duct 102 in fluid communication with the second duct 104 when the second duct 104 is installed on the first duct 102. While the depicted duct system 100 includes the tab 130 fixing the first duct 102 with the second duct 104, the duct system 100 may additionally or alternatively include a clip or other type of fastener fixing the first duct 102 with the second duct 104 when the second duct 104 is installed on the first duct 102.

With continued reference to FIG. 1, the duct system 100 includes fasteners 132 that fix the first duct 102 and the second duct 104 in the axial direction 114 of the first duct opening 112. The fasteners 132 are arranged at a side of the first duct wall 110 opposite the tab 130 and across the first duct opening 112 in the lateral direction 124 of the first duct opening 112. With this construction, the fasteners 132 press the first duct 102 and the second duct 104 together in the axial direction 114 at the side of the first duct wall 110 opposite the tab 130. While the depicted fasteners 132 are bolts, the fasteners 132 may additionally or alternatively include screws, clamping mechanisms, clips, or similar types of fasteners without departing from the scope of the present disclosure.

Figure 2:
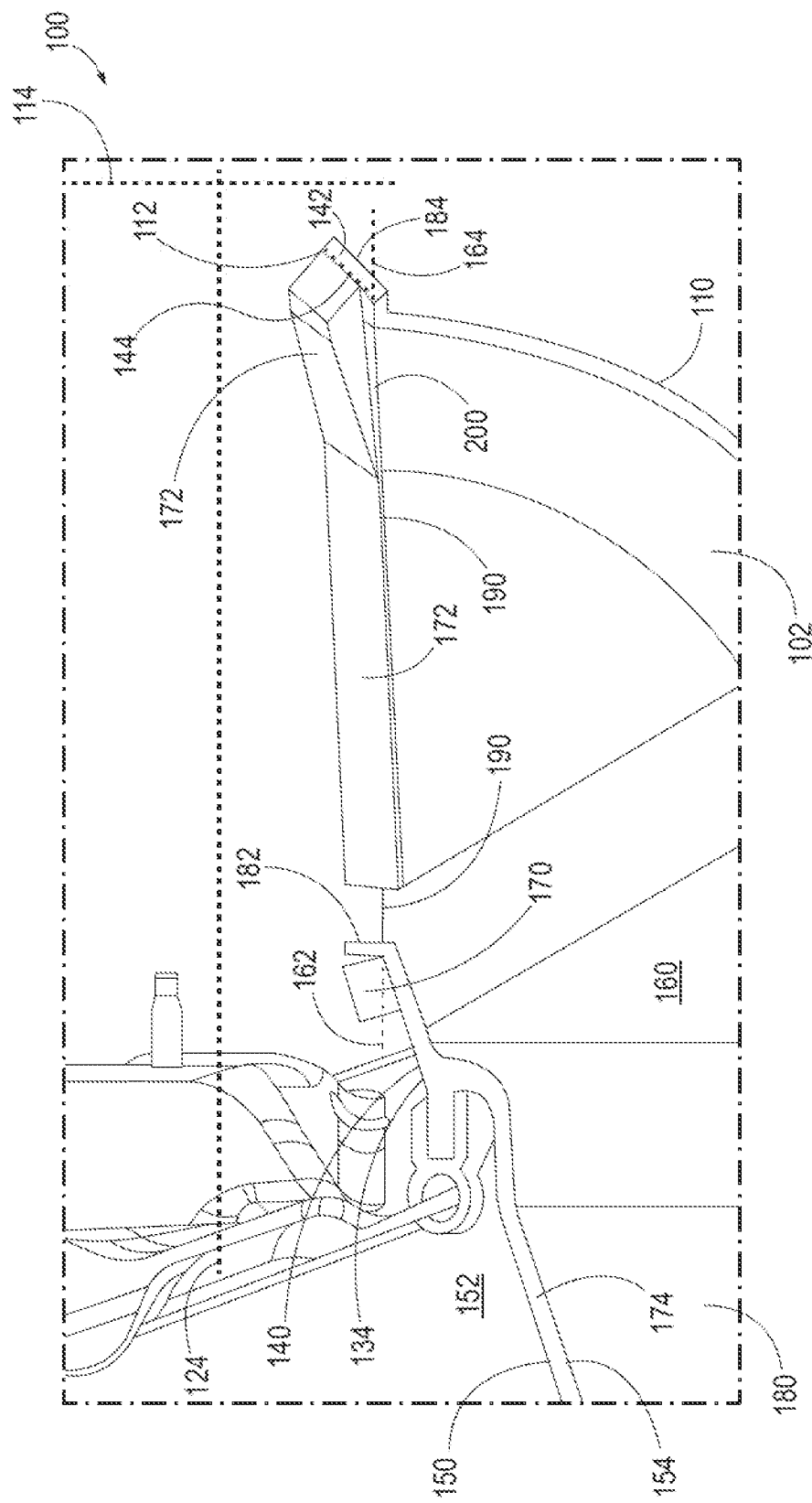
FIG. 2 is a partial cross-sectional view of the duct system of FIG. 1.

As shown in FIG. 2, the first duct wall 110 includes a shoulder 134 that forms a first contact surface 140. The first duct wall 110 also includes a rim 142 that defines the first duct opening 112 and forms a second contact surface 144 located at a side of the first duct wall 110 opposite the first contact surface 140, across the first duct opening 112 in the lateral direction 124 of the first duct opening 112. The first contact surface 140 is provided on an outer surface 150 of the first duct wall 110 that faces an exterior 152 of the first duct 102, and the second contact surface 144 is provided on an inner surface 154 of the first duct wall 110 that faces an interior 160 of the first duct 102.

The first contact surface 140 and the second contact surface 144 extend from the first duct 102 toward the second duct 104 at an angle between the axial direction 114 and the lateral direction 124 of the first duct opening 112 such that the first contact surface 140 and the second contact surface 144 are oriented in a same direction along the lateral direction 124 of the first duct opening 112. The first contact surface 140 extends at a first angle 162 between the axial direction 114 and the lateral direction 124 of the first duct opening 112, and the second contact surface 144 extends at a second angle 164 between the axial direction 114 and the lateral direction 124 of the first duct opening 112. With this construction, the first contact surface 140 and the second contact surface 144 are configured for engaging the second duct wall 120 when the second duct 104 is installed on the first duct 102 along the lateral direction 124 of the first duct opening 112. While the first angle 162 is depicted as offset about 16 degrees from the lateral direction 124 of the first duct opening 112, and the second angle 164 is depicted as offset about 45 degrees from the lateral direction 124 of the first duct opening 112, the first contact surface 140 and the second contact surface 144 may additionally or alternatively extend at a variety of angles along the axial direction 114 of the first duct opening 112 for engaging the second duct 104 in the lateral direction 124 of the first duct opening 112 without departing from the scope of the present disclosure.

With continued reference to FIG. 2, the shoulder 134 and the rim 142 are integrally formed from the first duct wall 110, where the rim 142 extends from the shoulder 134 in the axial direction 114 of the first duct opening 112 at the first contact surface 140. A first seal 170 is disposed on the shoulder 134, along the first contact surface 140 and the rim 142. A second seal 172 is disposed on the rim 142, along the second contact surface 144. The first seal 170 and the second seal 172 are configured for being compressed between the first duct wall 110 and the second duct wall 120, thereby sealing the first duct 102 in fluid communication with the second duct 104 at the first duct opening 112 and the second duct opening 122.

In the depicted embodiment, the first seal 170 and the second seal 172 are closed cell foam bands mounted on the first duct wall 110 and configured for being pressed against the second duct wall 120 to form a seal between the first duct wall 110 and the second duct wall 120. The first seal 170 and the second seal 172 are formed from a foam material configured for being compressed between the first duct 102 and the second duct 104 when the second duct 104 is installed on the first duct 102. Each of the first seal 170 and the second seal 172 may additionally or alternatively embody a gasket or other seal type (e.g., a bulb seal), may alternatively be mounted on the second duct 104 for being pressed against the first duct 102, and may additionally or alternatively be formed from rubber, paper, silicone, metal, cork, cloth, fiberglass or other material for being compressed and forming a seal between the first duct 102 and the second duct 104 without departing from the scope of the present disclosure.

The first duct wall 110 is formed from an upper first duct portion 174 fixed with a lower first duct portion 180 such that the upper first duct portion 174 and the lower first duct portion 180 are configured for conveying fluid through the interior 160 of the first duct 102 and the first duct opening 112. While the depicted first duct wall 110 is formed from the upper first duct portion 174 and the lower first duct portion 180, the first duct wall 110 may alternatively be formed from more or fewer duct portions without departing from the scope of the present disclosure.

With continued reference to FIG. 2, the shoulder 134 and a first rim portion 182 formed from the rim 142 at the first contact surface 140 terminate behind a second rim portion 184 formed from the rim 142 at the second contact surface 144 with respect to the axial direction 114 of the first duct opening 112 from the first duct 102 toward the second duct 104. The first contact surface 140 and the second contact surface 144 are positioned offset from each other in the axial direction 114 of the first duct opening 112, with the first contact surface 140 located behind the second contact surface 144 with respect to the axial direction 114 of the first duct opening 112 from the first duct 102 toward the second duct 104.

Figure 3:
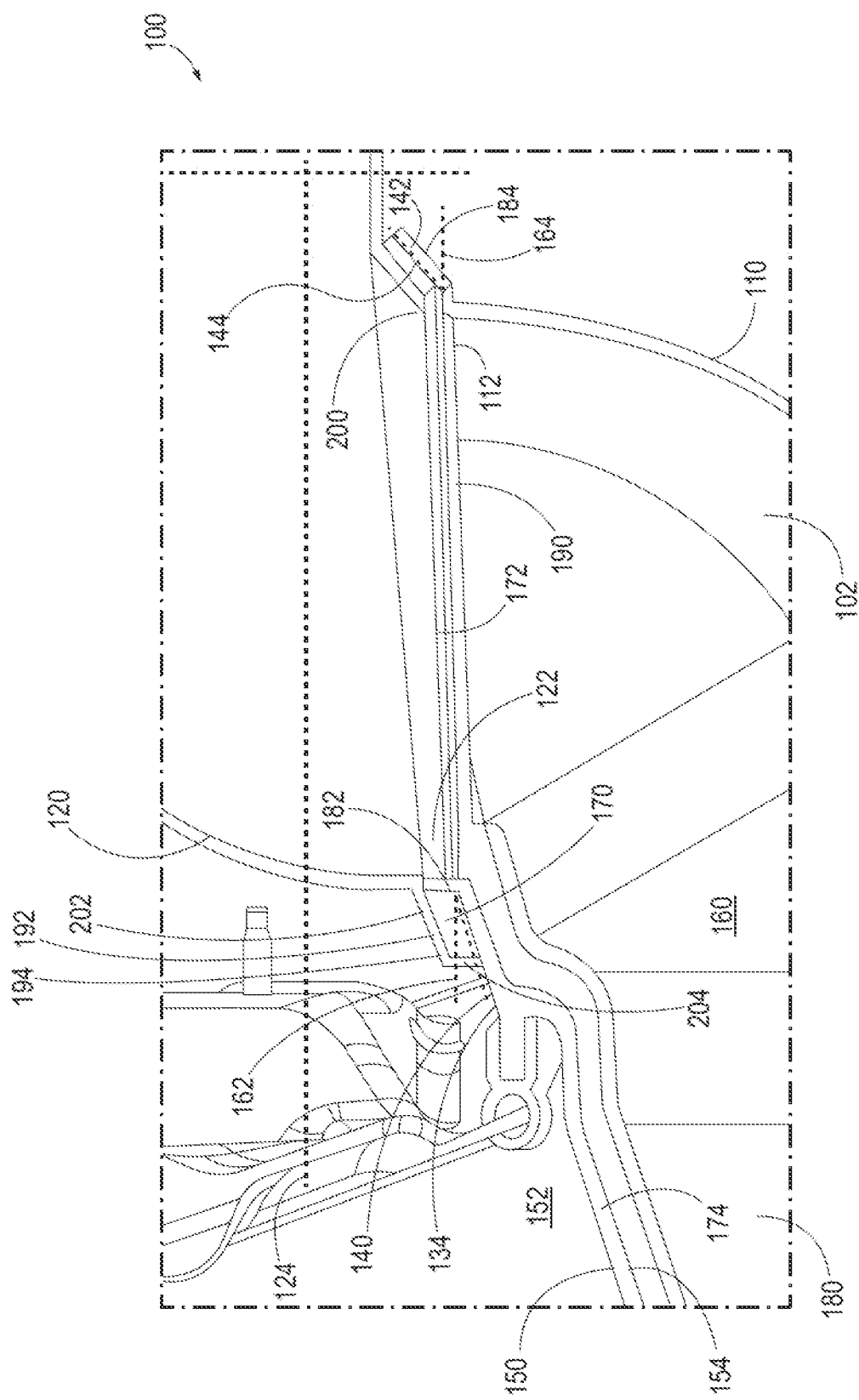
FIG. 3 is another partial cross-sectional view of the duct system of FIG. 1.

With this construction, as shown in FIG. 3, the first duct 102 is configured for receiving the second duct 104 in the installation direction, along the lateral direction 124 of the first duct opening 112 from the first contact surface 140 toward the second contact surface 144 when the second duct 104 is installed on the first duct 102, without the rim 142 at the first contact surface 140 obstructing the second duct 104 from engaging the second contact surface 144. While the depicted installation direction of the second duct 104 is aligned with the lateral direction 124 of the first duct opening 112, the installation direction of the second duct 104 can be angled offset from and otherwise directed along the lateral direction 124 of the first duct opening 112 from the first contact surface 140 toward the second contact surface 144 without departing from the scope of the present disclosure.

With the second duct 104 installed on the first duct 102, the first contact surface 140 and the second contact surface 144 respectively engage with and seal against the second duct wall 120 through the first seal 170 and the second seal 172. Because the first contact surface 140 and the second contact surface 144 extend from the first duct 102 toward the second duct 104 at an angle between the axial direction 114 of the first duct opening 112 and the lateral direction 124 of the first duct opening 112, the first contact surface 140 and the second contact surface 144 engage with and seal against the second duct wall 120 in the axial direction 114 of the first duct opening 112, and in the lateral direction 124 of the first duct opening 112.

The first contact surface 140 is engaged with and sealed against the second duct wall 120 through the first seal 170, and the second contact surface 144 is engaged with and sealed against the second duct wall 120 through the second seal 172. The first seal 170 and the second seal 172 are respectively compressed against the first duct wall 110 in a direction perpendicular to the first angle 162 at the first contact surface 140 and the second angle 164 at the second contact surface 144. With this construction, the first contact surface 140 and the second contact surface 144 are engaged with and sealed against the second duct wall 120 in the axial direction 114 of the first duct opening 112 and the lateral direction 124 of the first duct opening 112, sealing the first duct wall 110 in fluid communication with the second duct wall 120. As such, the installation direction of the second duct 104 along the lateral direction 124 of the first duct opening 112 is aligned with a sealing direction of the first seal 170 and a sealing direction of the second seal 172, while the first contact surface 140 and the second contact surface 144 are also sealed against the second duct wall 120 in the axial direction 114 of the first duct opening 112.

With continued reference to FIG. 3, the first seal 170 is disposed on the shoulder 134 along the first contact surface 140 and the rim 142 such that the first contact surface 140 and the first rim portion 182 engage with and seal against the second duct wall 120 through the first seal 170 when the second duct 104 is installed on the first duct 102 along the lateral direction 124 of the first duct opening 112, and such that the first contact surface 140 engages with and seals against the second duct wall 120 through the first seal 170 when the second duct 104 is fastened to the first duct 102 along the axial direction 114 of the first duct opening 112.

The second contact surface 144 is disposed around a perimeter 190 of the first duct opening 112 such that the second contact surface 144 is engaged with and sealed against the second duct wall 120 through the second seal 172 at a position located across the first duct opening 112 from the first contact surface 140 and the first seal 170 in the installation direction of the second duct 104, along the lateral direction 124 of the first duct opening 112. The second contact surface 144 is also disposed around the perimeter 190 of the first duct opening 112 such that end portions of the second contact surface 144 are engaged with and sealed against the second duct wall 120 through the second seal 172 at positions interposed between and separated by the first duct opening 112 in a direction perpendicular to the axial direction 114 of the first duct 102, and perpendicular to the installation direction of the second duct 104 along the lateral direction 124 of the first duct opening 112.

The second duct wall 120 includes a lip 192 that defines the second duct opening 122. The lip 192 is integrally formed from the second duct wall 120 and configured for engaging with and sealing against the first contact surface 140 and the second contact surface 144 through the first seal 170 and the second seal 172. The lip 192 includes a first lip portion 194 engaged with and sealed against the first contact surface 140 and the first rim portion 182, and includes a second lip portion 200 engaged with and sealed against the second contact surface 144, along the second rim portion 184. The first lip portion 194 extends from the second duct 104 toward the first duct 102 at an angle parallel with the first angle 162 at the first contact surface 140, and the second lip portion 200 extends at an angle parallel with the second angle 164 at the second contact surface 144.

With continued reference to FIG. 3, the first lip portion 194 has a first section 202 extending along the lateral direction 124 of the first duct opening 112, at the first angle 162 such that the first seal 170 is compressed between the first contact surface 140 and the first section 202 in a direction perpendicular to the first angle 162. The first lip portion 194 has a second section 204 that extends in the axial direction 114 of the first duct opening 112, at an angle parallel with the first rim portion 182 such that the first seal 170 is compressed between the first rim portion 182 and the second section 204 in the lateral direction 124 of the first duct opening 112, perpendicular to the angle of the first rim portion 182 and the first lip portion 194.

While the first angle 162 is depicted as offset about 16 degrees from the lateral direction 124 of the first duct opening 112, and the second angle 164 is depicted as offset about 45 degrees from the lateral direction 124 of the first duct opening 112, the first lip portion 194 and the second lip portion 200 may additionally or alternatively extend at a variety of angles along the axial direction 114 of the first duct opening 112 for being parallel with the first contact surface 140 and the second contact surface 144 for engagement and sealing in the lateral direction 124 of the first duct opening 112 without departing from the scope of the present disclosure.

Figure 4:
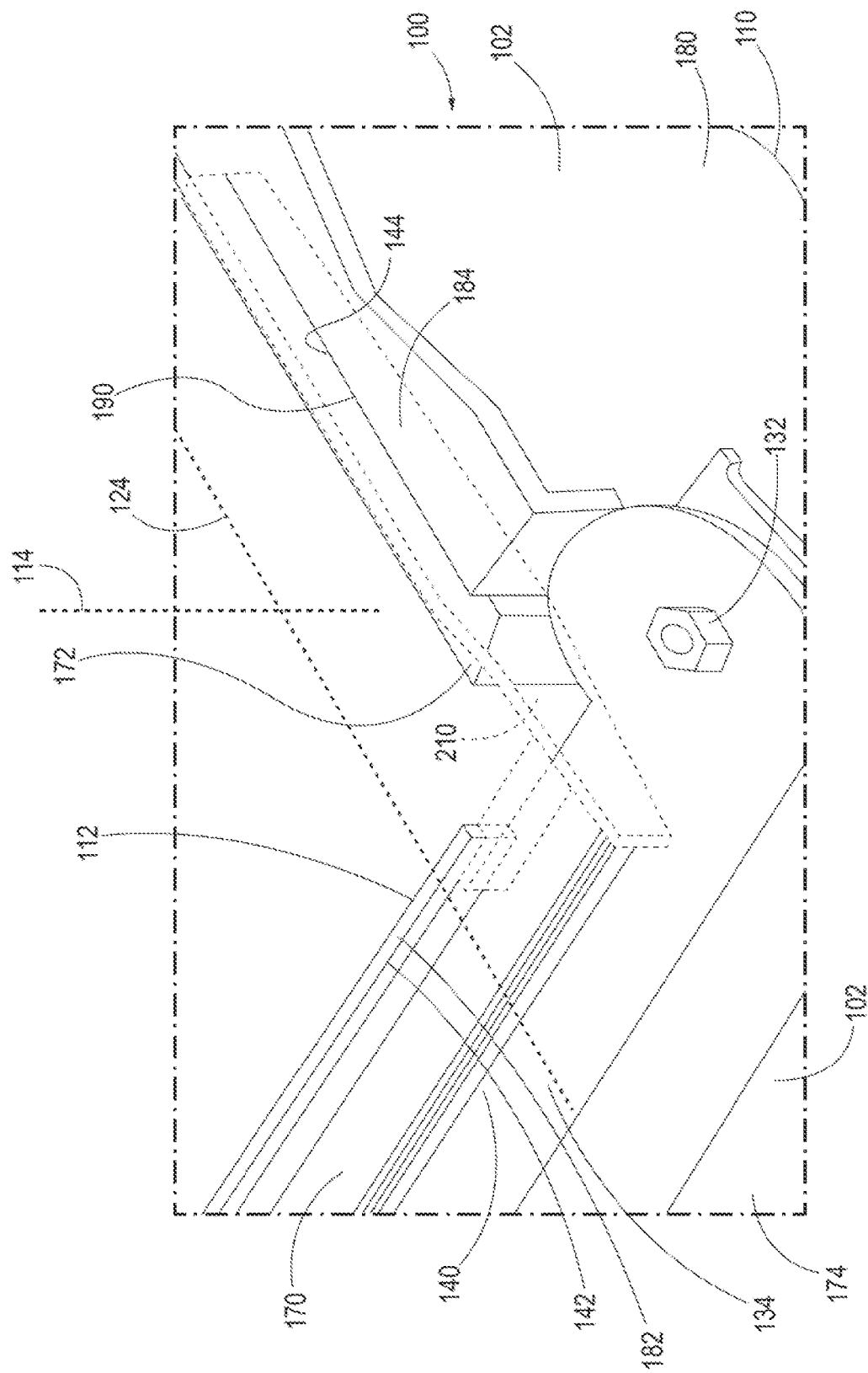
FIG. 4 is an enlarged partial perspective view of the duct system of FIG. 1.

FIG. 4 depicts the duct system 100 without the second duct 104 fixed with the first duct 102. As shown in FIG. 4, the first rim portion 182 and the first seal 170 define a space 210, drawn in hidden lines, with the second rim portion 184 and the second seal 172 in a direction perpendicular to the axial direction 114 of the first duct opening 112 and the lateral direction 124 of the first duct opening 112. With this construction, the first duct 102 is configured for receiving the second duct 104, including the second duct wall 120, in the space 210 with the first duct opening 112 offset from the second duct opening 122 in the lateral direction 124 of the first duct opening 112. Once positioned on the first duct 102, the second duct 104 is moved in the installation direction along the lateral direction 124 of the first duct opening 112 such that the first contact surface 140 and the second contact surface 144 respectively engage with and seal against the first lip portion 194 and the second lip portion 200, bringing the first duct 102 in fluid communication with the second duct 104. The first seal 170 extends beyond the first rim portion 182 and toward the fasteners 132 in the direction perpendicular to the axial direction 114 and the lateral direction 124 of the first duct opening 112.

As shown between FIGS. 1 and 4, the fasteners 132 fix the first duct 102 with the second duct 104 at a position located across the space 210 from the first seal 170 and the second seal 172 in the direction perpendicular to the axial direction 114 and the lateral direction 124 of the first duct opening 112. The fasteners 132 are positioned at each side of the first seal 170 in the lateral direction 124 of the first duct opening 112 such that the first seal 170 is interposed between and separates the fasteners 132 in the lateral direction 124 of the first duct opening 112.

With reference to FIG. 1, the tab 130 forms a third contact surface 212 configured for engaging the second duct 104 and pressing the second duct 104 against the first duct 102 in the axial direction 114 of the first duct opening 112. The third contact surface 212 extends from the first duct 102 toward the second duct 104 at an angle offset from the axial direction 114 of the first duct opening 112 such that when the second duct 104 is installed on the first duct 102 in the installation direction, the third contact surface 212 presses the second duct wall 120 in the axial direction 114 of the first duct opening 112, and obstructs movement of the second duct 104 in the installation direction when the first contact surface 140 and the second contact surface 144 are engaged with and sealed against the second duct 104.

Figure 5:
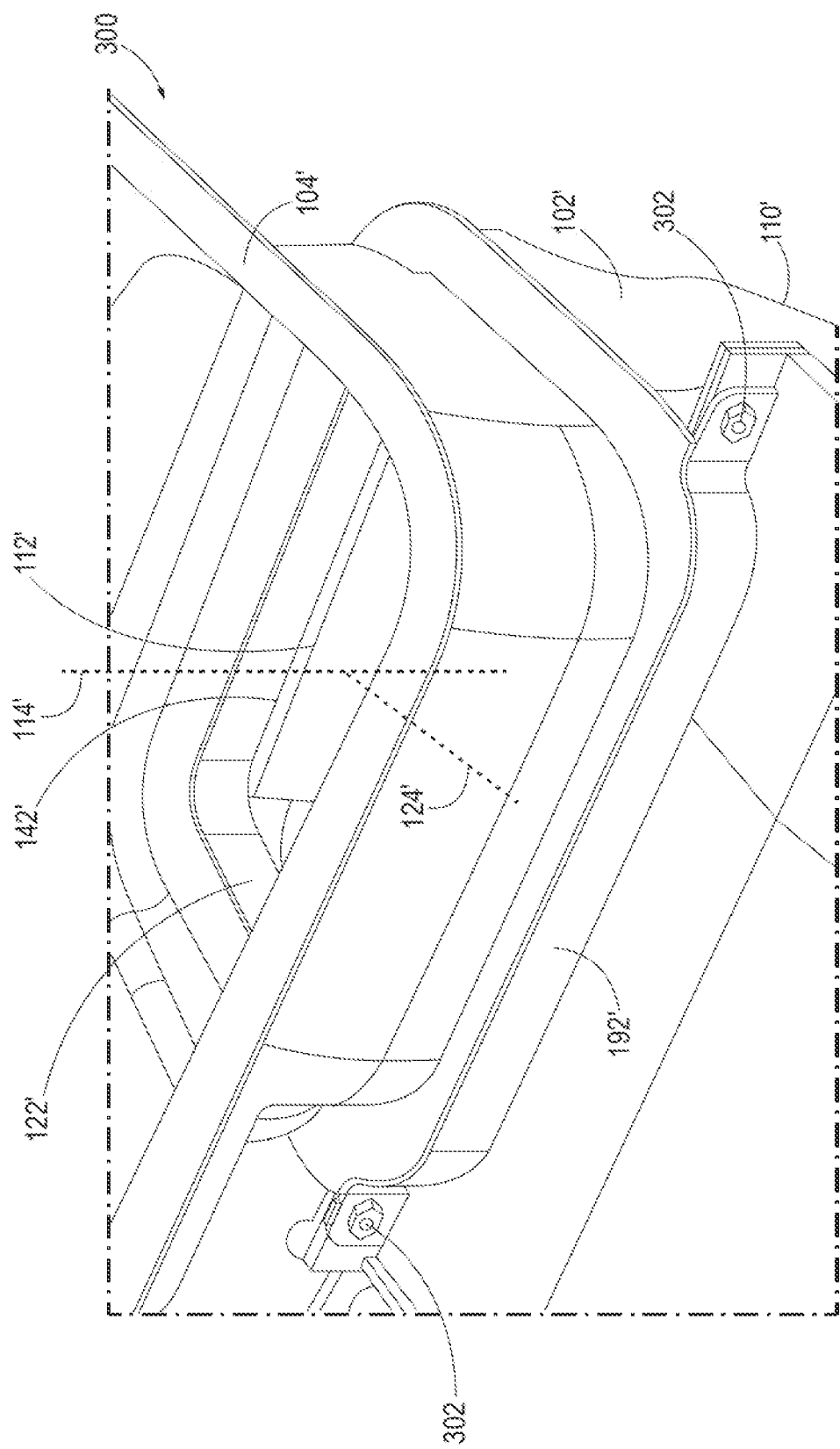
FIG. 5 is a partial perspective view of a duct system according to another aspect of the present disclosure.

FIGS. 5-8 depict a duct system 300 as an alternate embodiment of the duct system 100 of FIGS. 1-4. In the embodiment of FIGS. 5-8, like elements with the duct system 100 of FIGS. 1-4 are denoted with the same reference numerals but followed by a primed suffix ('). FIG. 5 illustrates the duct system 300 with the first duct 102' sealed in fluid communication with the second duct 104', where fasteners 302 fix the first duct 102' with the second duct 104' in the lateral direction 124' of the first duct opening 112'. The first duct wall 110' includes the rim 142' extended in the axial direction 114' of the first duct opening 112', and the second duct wall 120' includes the lip 192' defining the second duct opening 122' in fluid communication with the first duct opening 112'.

Figure 6:
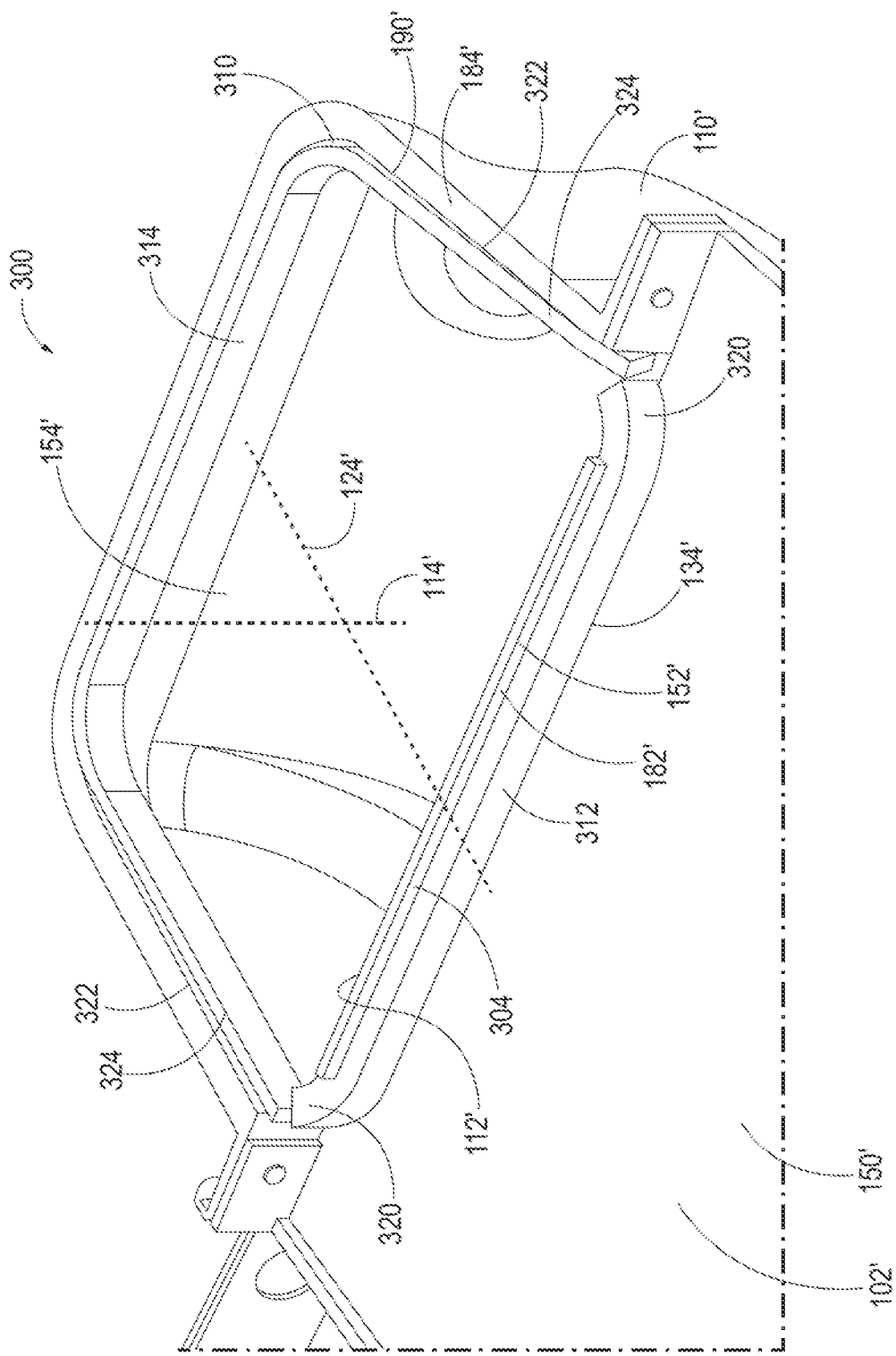
FIG. 6 is another partial perspective view of the duct system of FIG. 5.

As shown in FIG. 6, a first contact surface 304 is provided on the outer surface 150' of the first duct wall 110' at the first rim portion 182', along the shoulder 134'. A second contact surface 310 is provided on the inner surface 154' of the first duct wall 110' at the second rim portion 184', at a side of the first duct wall 110' opposite the first contact surface 304, across the first duct opening 112' in the lateral direction 124' of the first duct opening 112'. The first contact surface 304 and the second contact surface 310 are configured for engaging with and sealing against the second duct wall 120' when the second duct 104' is installed on the first duct 102' along the lateral direction 124' of the first duct opening 112', bringing the first duct 102' in fluid communication with the second duct 104' through the first duct opening 112' and the second duct opening 122'.

A first seal 312 is disposed on the first rim portion 182', along the first contact surface 304, and a second seal 314 is disposed on the second rim portion 184', along the second contact surface 310. The first seal 312 includes first seal end portions 320 which extend beyond the first rim portion 182' and toward the fasteners 302 in the direction perpendicular to the axial direction 114' and the lateral direction 124' of the first duct opening 112'. The first seal end portions 320 extend at least partially around the first rim portion 182' and into the first duct opening 112' in the lateral direction 124' of the first duct opening 112'.

The second contact surface 310 is also disposed around the perimeter 190' of the first duct opening 112' such that second contact surface end portions 322 formed from the second contact surface 310 are interposed between and separated by the first duct opening 112' in the direction perpendicular to the axial direction 114' and the lateral direction 124' of the first duct opening 112'. The second seal 314 includes second seal end portions 324 disposed on the inner surface 154' of the first duct wall 110', along the second contact surface end portions 322. The first duct opening 112' is interposed between and separates the second seal end portions 324 with the second contact surface end portions 322. The second seal end portions 324 extend beyond the second contact surface 310 and toward the first contact surface 304 in the lateral direction 124' of the first duct opening 112'.

The second seal end portions 324 are tapered in the axial direction 114' of the first duct opening 112' where the second seal end portions 324 extend beyond the second contact surface 310. The second seal end portions 324 are tapered along the lateral direction 124' of the first duct opening 112' from the second contact surface 310 toward the first contact surface 304.

The second contact surface end portions 322 extend linearly toward the first contact surface 304 in the lateral direction 124' of the first duct opening 112', and away from each other and in the direction perpendicular to the axial direction 114' and the lateral direction 124' of the first duct opening 112'. As such, the second contact surface 310 opens toward the first contact surface 304 in the lateral direction 124' of the first duct opening 112'.

Figure 7:
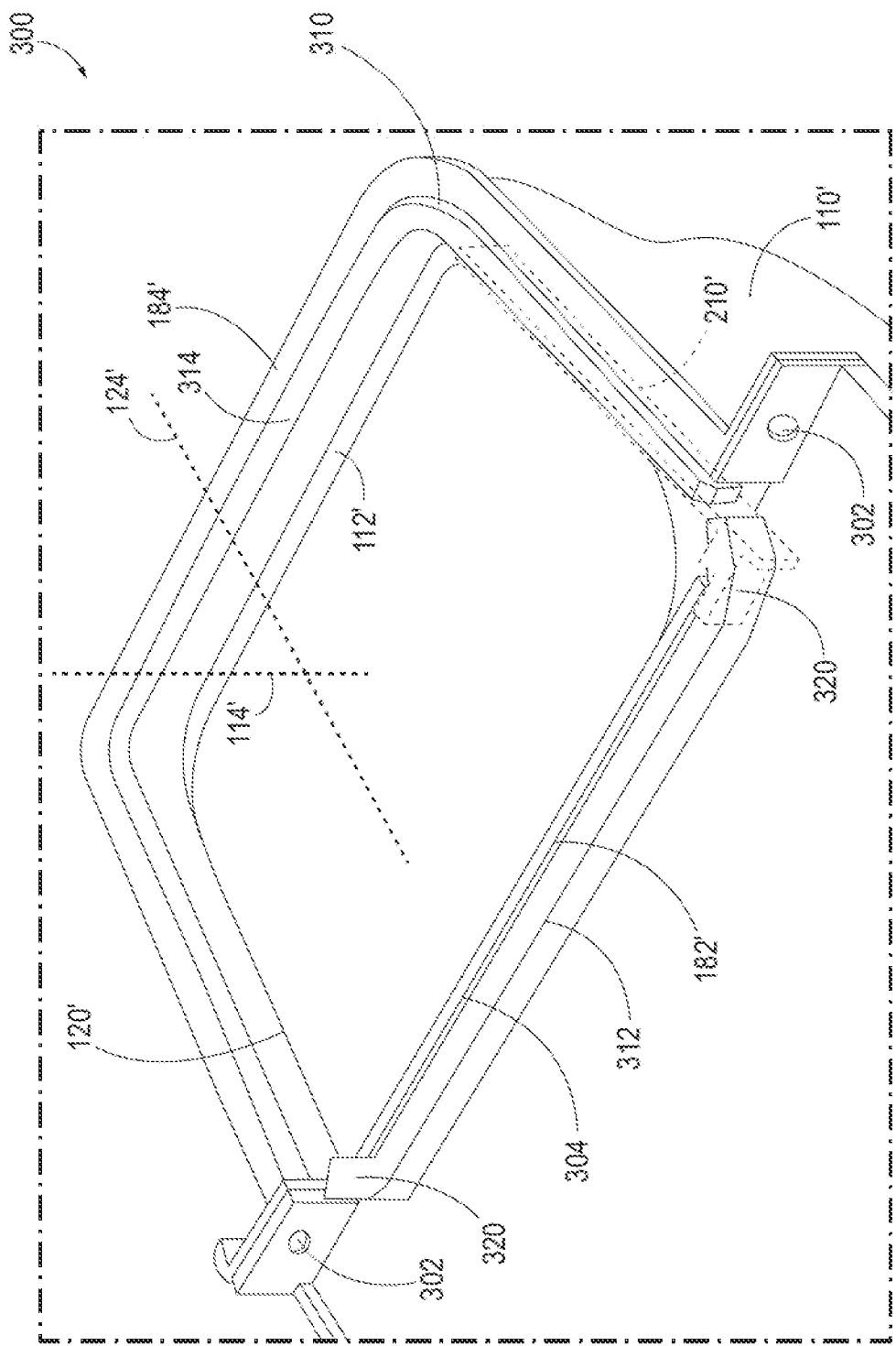
FIG. 7 is another partial perspective view of the duct system of FIG. 5.

As shown in FIG. 7, the first rim portion 182' and the first seal 312 define the space 210', drawn in hidden lines, with the second rim portion 184' and the second seal 314 in the direction perpendicular to the axial direction 114' and the lateral direction 124' of the first duct opening 112'. With this construction, the first duct 102' is configured for receiving the second duct 104' in the space 210' and installed along the lateral direction 124' of the first duct opening 112' such that the first contact surface 304 and the second contact surface 310 engage with and seal against the second duct wall 120' in the lateral direction 124' of the first duct opening 112'.

Figure 8:
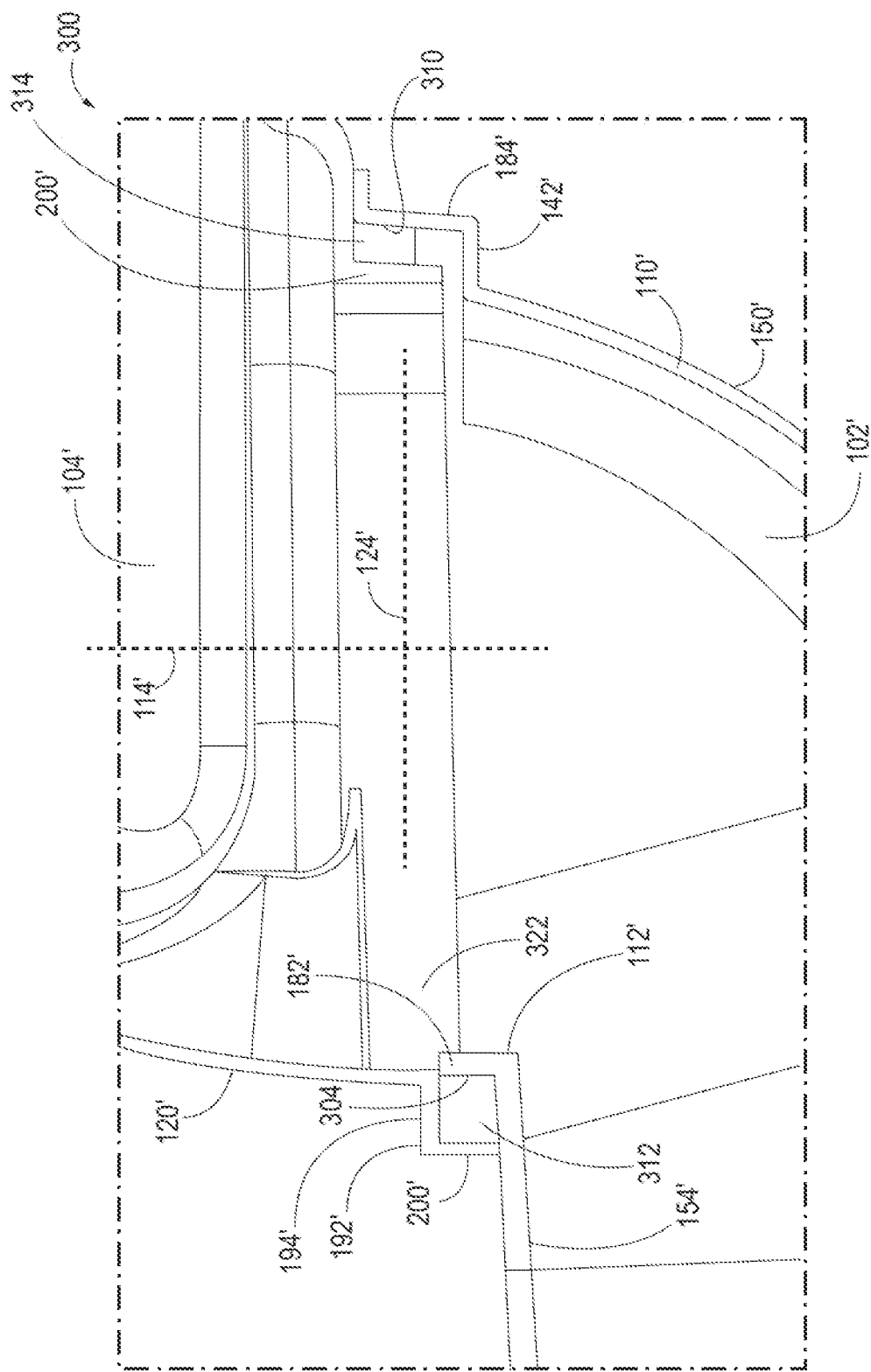
FIG. 8 is a partial cross-sectional view of the duct system of FIG. 5.

As shown in FIG. 8, the first contact surface 304 is engaged with and sealed against the second duct wall 120' through the first seal 312 such that the first seal 312 is compressed between the first contact surface 304 and the lip 192' of second duct wall 120' in the lateral direction 124' of the first duct opening 112'. The second contact surface 310 is engaged with and sealed against the second duct wall 120' through the second seal 314 such that the second seal 314 is compressed between the second contact surface 310 and the lip 192' of the second duct wall 120' in the lateral direction 124' of the first duct opening 112'.

The rim 142' at the first contact surface 304 terminates behind the rim 142' at the second contact surface 310 with respect to the axial direction 114' of the first duct opening 112' from the first duct 102' toward the second duct 104'. With this construction, when the second duct 104' is installed on the first duct 102' along the lateral direction 124' of the first duct opening 112', the first contact surface 304 and the second contact surface 310 engage with and seal against the second duct wall 120' without the first rim portion 182' obstructing the lip 192' in the second duct 104' from engaging the second contact surface 310.

The first contact surface 304 and the second contact surface 310 extend from the first duct 102' toward the second duct 104' in the axial direction 114' of the first duct opening 112', and seal against the second duct 104' in the lateral direction 124' of the first duct opening 112' when the second duct 104' is installed on the first duct 102' in the lateral direction 124' of the first duct opening 112'. With the first contact surface 304 provided on the outer surface 150' of the first duct wall 110' and the second contact surface 310 provided on the inner surface 154' of the first duct wall 110', the first contact surface 304 and the second contact surface 310 are oriented in a same direction along the lateral direction 124' of the first duct opening 112'. While the first contact surface 304 and the second contact surface 310 are depicted extending in the axial direction 114' of the first duct opening 112', the first contact surface 304 and the second contact surface 310 may each alternatively or additionally extend toward the second duct 104' at an angle between the axial direction 114' and the lateral direction 124' of the first duct opening 112' for engaging the second duct 104' in the lateral direction 124' of the first duct opening 112' without departing from the scope of the present disclosure.

With continued reference to FIG. 8, the rim 142' at the first contact surface 304 extends along the axial direction 114' of the first duct opening 112', from a portion of the first duct wall 110' oriented along the lateral direction 124' of the first duct opening 112'. The first seal 312 is disposed on the first duct wall 110' and the first rim portion 182', along the first contact surface 304. With this construction, when the second duct 104' is installed on the first duct 102' along the lateral direction 124' of the first duct opening 112', the first seal 312 is compressed between the rim 142' and the second duct wall 120' in the lateral direction 124' of the first duct opening 112', and the first seal 312 is compressed between the first duct wall 110' and the second duct wall 120' in the axial direction 114' of the first duct opening 112'.

The lip 192' includes the first lip portion 194', which extends along the lateral direction 124' of the first duct opening 112'. The lip 192' also includes the second lip portion 200', which extends from the first lip portion 194' toward the first duct 102' along the axial direction 114' of the first duct opening 112'.

The first duct wall 110' is sealed against the second duct wall 120' at the first contact surface 304 and through the first seal 312 such that the first seal 312 is compressed in the axial direction 114' of the first duct opening 112' between the first duct wall 110' and the first lip portion 194', and compressed in the lateral direction 124' of the first duct opening 112' between the first contact surface 304 and the second lip portion 200'.

While the depicted embodiment includes the first seal 312 and the second seal 314 disposed on the first duct wall 110' and configured for being pressed against the second duct wall 120' to form a seal between the first duct wall 110' and the second duct wall 120', the first seal 312 and the second seal 314 may alternatively be disposed on the second duct 104' for being pressed against the first duct 102' without departing from the scope of the present disclosure. Unless otherwise stated herein, the fasteners 302, the first contact surface 304, the second contact surface 310, the first seal 312, and the second seal 314 in the duct system 300 include similar features and function in a similar manner as the fasteners 132, the first contact surface 140, the second contact surface 144, the first seal 170, and the second seal 172 in the duct system 100.

With reference to FIGS. 3 and 8, a method of assembling each of the duct systems 100, 200 for an air intake system for a vehicle includes providing the first duct 102, 102' including the first duct wall 110, 110' that defines the first duct opening 112, 112' and forms a conduit configured for conveying fluid through the first duct opening 112, 112' in the axial direction 114, 114' of the first duct opening 112, 112'. The method of assembling each of the duct systems 100, 200 also includes disposing the first seal 170, 312 along the first contact surface 140, 304 and disposing a second seal 172, 314 along the second contact surface 144, 310. The method of assembling each of the duct systems 100, 200 also includes providing the second duct 104, 104', including the second duct wall 120, 120' that defines the second duct opening 122, 122' and forms a conduit configured for conveying fluid through the second duct opening 122, 122'. The first duct 102, 102' also includes the first contact surface 140, 304 provided on the outer surface 150, 150' of the first duct wall 110, 110', and the second contact surface 144, 310 provided on the inner surface 154, 154' of the first duct wall 110, 110' and located at the side of the first duct wall 110, 110' opposite the first contact surface 140, 304, across the first duct opening 112, 112' in the lateral direction 124, 124' of the first duct 102, 102', perpendicular to the axial direction 114, 114' of the first duct opening 112, 112'. The first contact surface 140, 304 and the second contact surface 144, 310 are positioned offset from each other in the axial direction 114, 114' of the first duct opening 112, 112'.

The method of assembling each of the duct systems 100, 200 includes installing the second duct 104, 104' on the first duct 102, 102' along the lateral direction 124, 124' of the first duct opening 112, 112' such that the first contact surface 140, 304 engages and seals against the second duct wall 120, 120' through the first seal 170, 312, compressing the first seal 170, 312 in the lateral direction 124, 124' of the first duct opening 112, 112', and such that the second contact surface 144, 310 engages and seals against the second duct wall 120, 120' through the second seal 172, 314, compressing the second seal 172, 314 in the lateral direction 124, 124' of the first duct opening 112, 112', bringing the first duct opening 112, 112' in fluid communication with the second duct opening 122, 122'.

Figure 9:
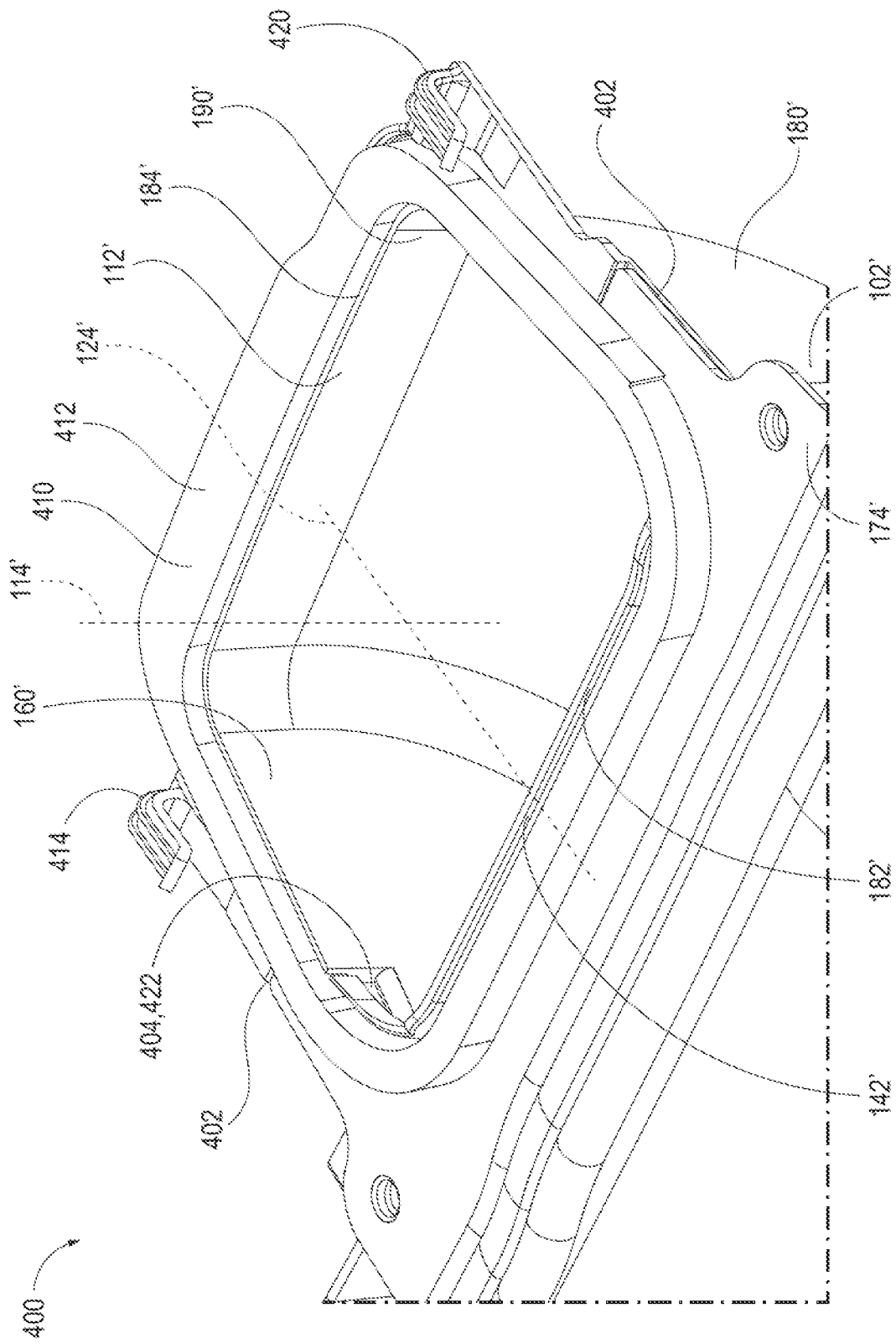
FIG. 9 is a partial perspective view of a duct system according to another aspect of the present disclosure.

FIGS. 9-12 depict a duct system 400 as an alternate embodiment of the duct system 100 of FIGS. 1-4. In the embodiment of FIGS. 9-12, like elements with the duct system 100 of FIGS. 1-4 are denoted with the same reference numerals but followed by a primed suffix ('). FIG. 9 illustrates the duct system 400 with the first duct 102' formed from the upper first duct portion 174' and the lower first duct portion 180', where the upper first duct portion 174' and the lower first duct portion 180' define the perimeter 190' of the first duct opening 112'.

The rim 142' of the first duct 102' is fixed with the first duct wall 110' and includes the first rim portion 182' and the second rim portion 184' extending from the first duct 102' in the axial direction 114' of the first duct opening 112'. The first rim portion 182' and the second rim portion 184' are disposed around the first duct opening 112', along the perimeter 190' of the first duct opening 112'. The first rim portion 182' is formed from the upper first duct portion 174', and the second rim portion 184' formed from the lower first duct portion 180'. The first rim portion 182' and the second rim portion 184' are disposed along opposite sides of the first duct opening 112' in the lateral direction 124' of the first duct opening 112', and contact each other at opposite sides of the first duct opening 112' in the direction perpendicular to the axial direction 114' and the lateral direction 124' of the first duct opening 112'.

The upper first duct portion 174' overlaps the lower first duct portion 180' in the axial direction 114' of the first duct opening 112'. The upper first duct portion 174' overlaps the lower first duct portion 180' at opposite sides of the first duct opening 112' in the direction perpendicular to the axial direction 114' and the lateral direction 124' of the first duct opening 112', defining paths 402 between the upper first duct portion 174' and the lower first duct portion 180'. The upper first duct portion 174' and the lower first duct portion 180' are spaced from each other along the first duct wall 110' such that the paths 402 defined therebetween are configured for guiding water, snow, and debris away from the interior 160' of the first duct 102'. A pair of path seals 404 are disposed between the upper first duct portion 174' and the lower first duct portion 180', along the paths 402 such that the path seals are interposed between and separate the interior 160' of the first duct 102' and the paths 402, thereby sealing the interior 160' of the first duct 102' from the paths 402 and preventing water, snow, and debris guided through the paths 402 from entering the interior 160' of the first duct 102'.

A first duct opening seal 410 is disposed over the upper first duct portion 174' and the lower duct portion 180', and over the paths 402 in the axial direction 114' of the first duct opening 112'. The first duct opening seal 410 is disposed around the rim 142', along and between the first rim portion 182' and the second rim portion 184'. The first duct opening seal 410 is an unbroken band shaped as a loop disposed around the perimeter 190' of the first duct opening 112', and contacts the first rim portion 182' and the second rim portion 184' along the perimeter 190'. With this construction, the rim 142' is configured to obstruct movement of the first duct opening seal 410 in the lateral direction 124' of the first duct opening 112' and the direction perpendicular to the axial direction 114' and the lateral direction 124' of the first duct opening 112'.

The lower duct portion 180' includes a ridge 412 extending therefrom in the axial direction 114' of the first duct opening 112'. The ridge 412 is positioned across the first duct opening seal 410 from the second rim portion 184', and disposed along a side of the lower duct portion 180' opposite the second rim portion 184' around the perimeter 190' of the first duct opening 112'. The first duct opening seal 410 is interposed between the second rim portion 184' and the ridge 412 in the lateral direction 124' of the first duct opening 112' and the direction perpendicular to the axial direction 114' and the lateral direction 124' of the first duct opening 112', where the second rim portion 184' and the ridge 412 are configured for obstructing movement of the first duct opening seal 410 therebetween. In this manner, the second rim portion 184' and the ridge 412 are configured to retain the first duct opening seal 410 on the first duct 102' in the lateral direction 124' of the first duct opening 112' and the direction perpendicular to the axial direction 114' and the lateral direction 124' of the first duct opening 112', including when the second duct 104' is installed on the first duct 102'.

The lower first duct portion 180' includes a first hook 414 and a second hook 420 disposed on opposite sides of the first duct opening 112' in the direction perpendicular to the axial direction 114' and the lateral direction 124' of the first duct opening 112'. The first hook 414 and the second hook 420 are fixed with the first duct 102' and extend from the lower first duct portion 180'. The first hook 414 and the second hook 420 are oriented in the lateral direction 124' of the first duct opening 112', and open toward the installation direction of the second duct 104' such that the first hook 414 and the second hook 420 are configured for receiving the second duct 104' in the installation direction so as to restrict movement of the second duct 104' in the axial direction 114' of the first duct opening 112'.

Figure 10:
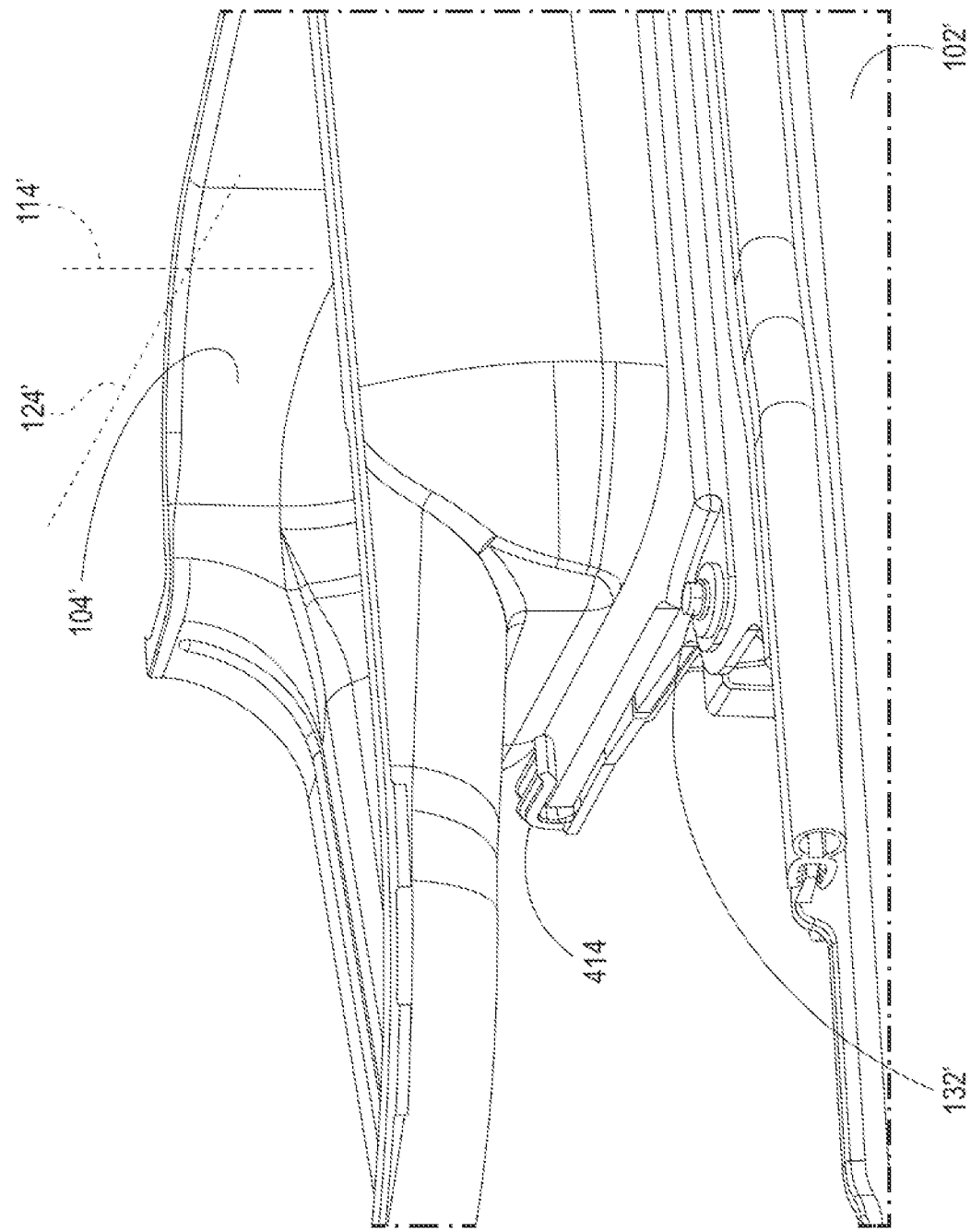
FIG. 10 is another partial perspective view of the duct system of FIG. 9.

As shown in FIG. 10, the second duct 104' is installed on the first duct 102' and received in the first hook 414 such that the first hook 414 obstructs movement of the second duct 104' in the axial direction 114' of the first duct opening 112'. More specifically, the portion of the second duct 104' received in the first hook 414 is interposed between and engaged with the first hook 414 and the first duct 102' such that the second duct 104' is obstructed from movement in the axial direction 114' of the first duct opening 112' at the first hook 414. The second hook 420 includes similar features and functions in a similar manner as the first hook 414 for retaining the second duct 104' on the first duct 102'.

The fasteners 132' fix the first duct 102' and the second duct 104' in the axial direction 114' of the first duct opening 112' at a side of the first duct opening 112' opposite the first hook 414 and the second hook 420 in the lateral direction 124' of the first duct opening 112'. With this construction, the fasteners 132' press the first duct 102' and the second duct 104' together in the axial direction 114' of the first duct opening 112' at the side of the first duct opening 112' opposite the first hook 414 and the second hook 420, compressing the first duct opening seal 410 between the first duct 102' and the second duct 104'. In this manner, the first duct 102' and the second duct 104' are sealed in fluid communication with each other across the first duct opening seal 410.

Figure 11:
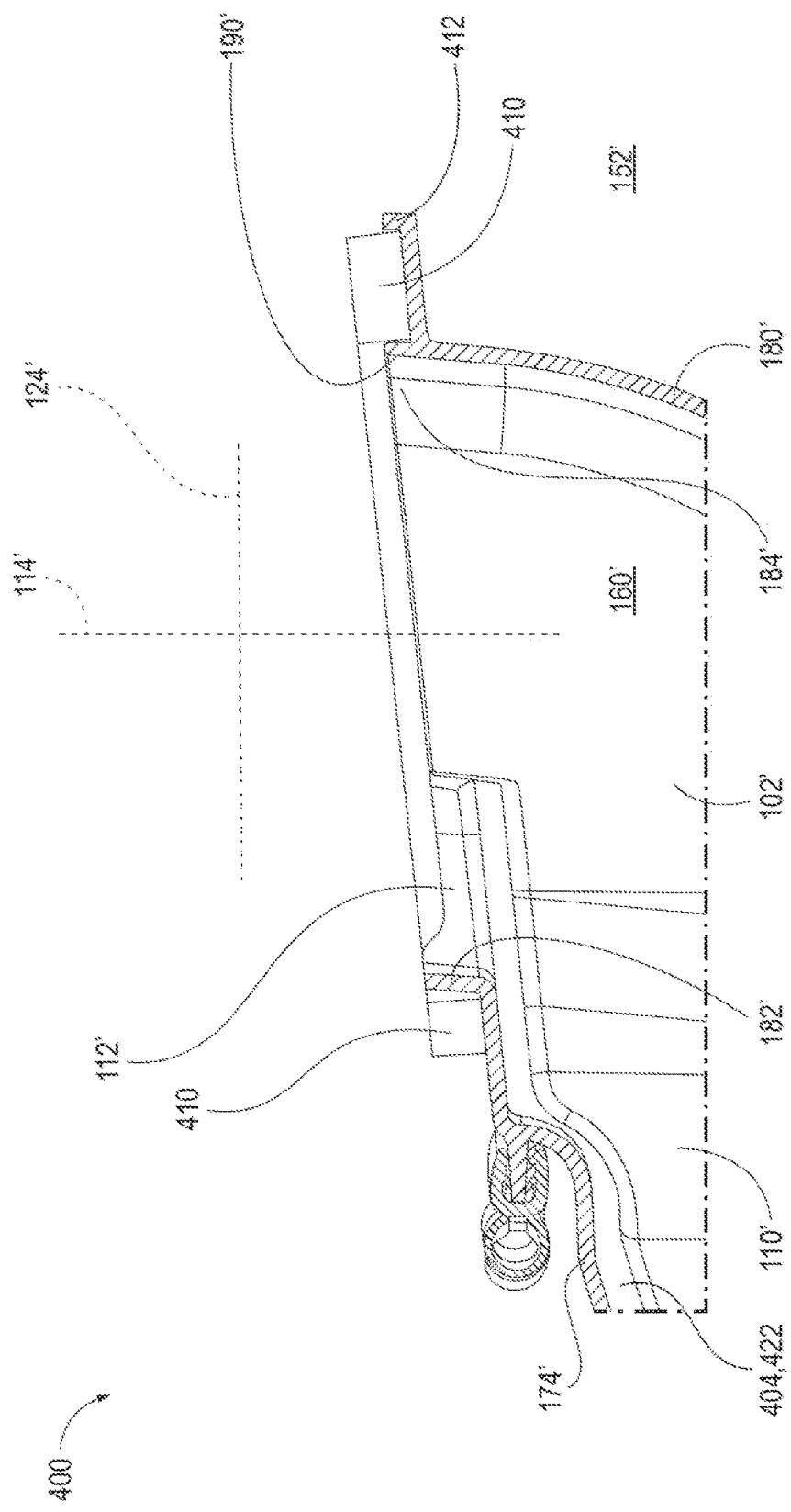
FIG. 11 is a partial cross-sectional view of the duct system of FIG. 9.

As shown in FIG. 11, a first path seal 422 in the pair of path seals 404 is disposed over the lower first duct portion 180' in the axial direction 114' of the first duct opening 112', and extends along the interior 160' of the first duct 102' in the lateral direction 124' of the first duct opening 112'. The first path seal 422 is compressed between the upper first duct portion 174' and the lower first duct portion 180' in the axial direction 114' of the first duct opening 112', sealing the interior 160' of the first duct 102' from the exterior 152' of the first duct 102'.

Figure 12:
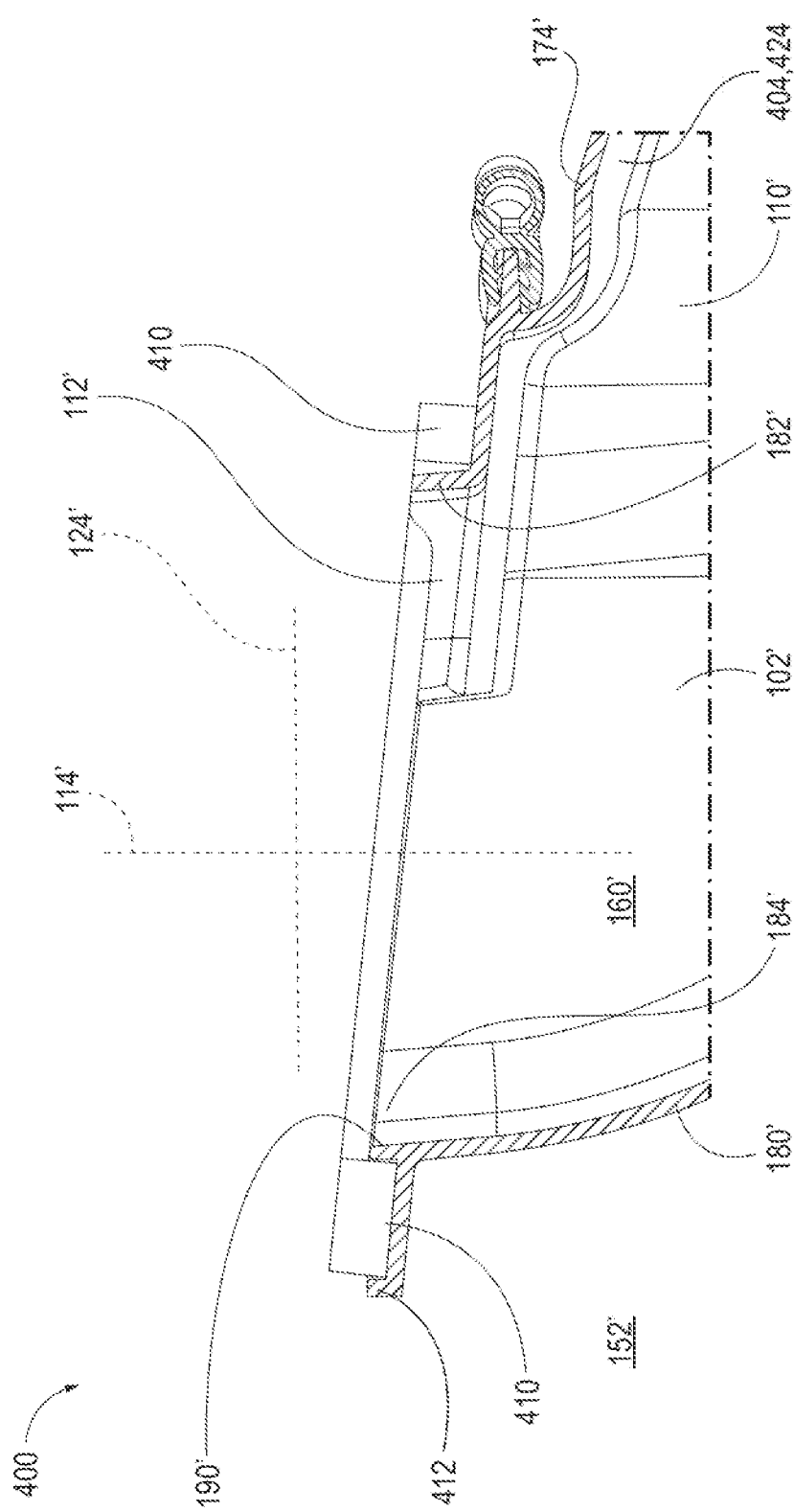
FIG. 12 is another partial cross-sectional view of the duct system of FIG. 9.

As shown in FIG. 12, a second path seal 424 in the pair of path seals 404 is disposed over the lower first duct portion 180' in the axial direction 114' of the first duct opening 112', and extends along the interior 160' of the first duct 102' in the lateral direction 124' of the first duct opening 112'. The second path seal 424 is disposed on a side of the first duct 102' opposite the first path seal 422 in the direction perpendicular to the axial direction 114' and the lateral direction 124' of the first duct opening 112'. The second path seal 424 is compressed between the upper first duct portion 174' and the lower first duct portion 180' in the axial direction 114' of the first duct opening 112', sealing the interior 160' of the first duct 102' from the exterior 152' of the first duct 102'. The first path seal 422 and the second path seal 424 include similar features and function in a similar manner to seal the interior 160' of the first duct 102' from the exterior 152' of the first duct 102' between the upper first duct portion 174' and the lower first duct portion 180'.

Figure 13:
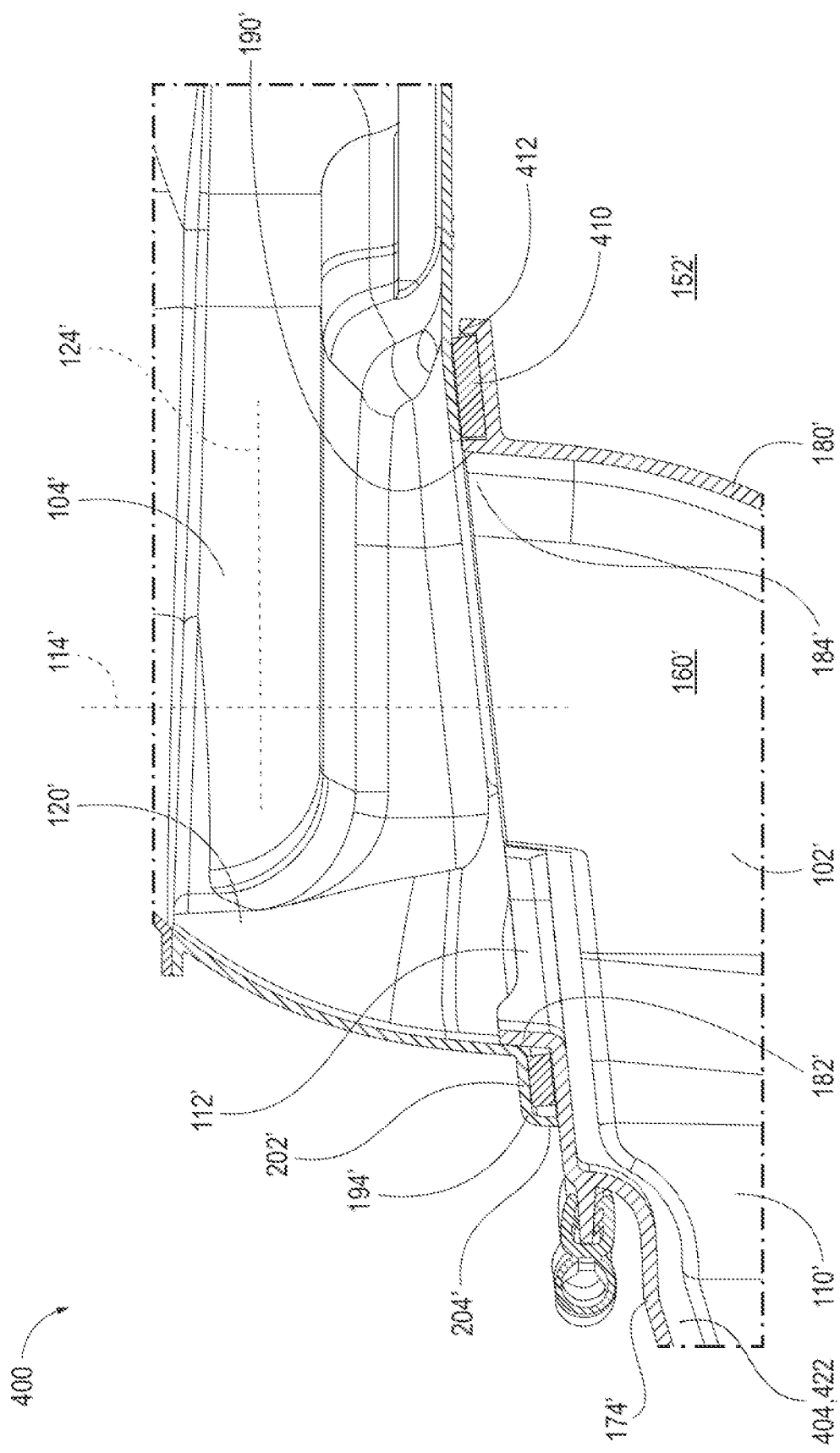
FIG. 13 is another partial cross-sectional view of the duct system of FIG. 9.

As shown in FIG. 13, the second duct 104' is installed on the first duct 102', and the first duct opening seal 410 is compressed between the first duct 102' and the second duct 104' in the axial direction 114' of the first duct opening 112'.

The first duct seal 410 is compressed around the perimeter 190' of the first duct opening 112' along the first rim portion 182' and the second rim portion 184', sealing the first duct 102' and the second duct 104' in fluid communication with each other at the first duct opening 112'.

The first duct opening seal 410 is compressed along the first rim portion 182' between the first section 202' of the first lip portion 194' and the upper first duct portion 174' in the axial direction 114' of the first duct opening 112'. The second section 204' of the first lip portion 194' extends from the first section 202' of the first lip portion 194' toward the upper first duct portion 174' in the axial direction 114' of the first duct opening 112', and engages the upper first duct portion 174' at a side of the first duct opening seal 410 opposite the first rim portion 182' in the lateral direction 124' of the first duct opening 112'. With this construction, the first duct 102' and the second duct 104' retain the first duct opening seal 410 between the first section 202' of the first lip portion 194' and the upper first duct portion 174' in the axial direction 114' of the first duct opening 112', and retain the first duct opening seal 410 between the second section 204' of the first lip portion 194' in the lateral direction 124' of the first duct opening 112'.

The first duct opening seal 410 is compressed along the second rim portion 184' between the second duct wall 120' and the lower first duct portion 180' in the axial direction 114' of the first duct opening 112'. The second duct wall 120' extends over the ridge 412 in the lateral direction 124' of the first duct opening 112' and engages the second rim portion 184'. With this construction, the first duct 102' and the second duct 104' retain the first duct opening seal 410 between the second duct wall 120' and the lower duct portion 180' in the axial direction 114' of the first duct opening 112', and retain the first duct opening seal 410 between the second rim portion 184' and the ridge 412 in the lateral direction 124' of the first duct opening 112'.

The first rim portion 182' extends from the upper first duct portion 174' in the axial direction 114' of the first duct opening 112' beyond the first lip portion 194', including the second section 202' of the first lip portion 194'. The first rim portion 182' is engaged with the second duct wall 120' and the first section 202' of the first lip portion 194' at the first rim portion 182', and is configured to obstruct movement of the second duct 104' in the installation direction when the second duct 104' is installed on the first duct 102'.

While the depicted duct system 400 includes the first rim portion 182' configured to obstruct movement of the second duct 104' in the installation direction when the second duct 104' is installed on the first duct 102', the duct system 400 may additionally or alternatively include the first hook 414 and the second hook 420 positioned to obstruct movement of the second duct 104 in the installation direction when the second duct 104' is installed on the first duct 102' without departing from the scope of the present disclosure. While, as depicted, the first duct opening seal 410, the first path seal 422, and the second path seal 424 are formed from closed cell foam, the first duct opening seal 410, the first path seal 422, and the second path seal 424 may additionally or alternatively be formed from bulb seals or other sealing elements configured for being compressed and sealing between the first duct 102' and the second duct 104' without departing from the scope of the present application.

It will be appreciated that the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A duct system for an air intake system for a vehicle, the duct system comprising:
   a first duct including
      a first duct wall that defines a first duct opening and forms a conduit configured for conveying fluid through the first duct opening in an axial direction of the first duct opening, and
      a rim fixed with the first duct wall and extending from the first duct in the axial direction of the first duct opening, and disposed around the first duct opening, with a first rim portion and a second rim portion disposed along opposite sides of the first duct opening in a lateral direction of the first duct opening perpendicular to the axial direction of the first duct opening, and
   a second duct including a second duct wall that defines a second duct opening in fluid communication with the first duct opening, and forms a conduit configured for conveying fluid through the second duct opening,
   wherein when the second duct is installed on the first duct in an installation direction along the lateral direction of the first duct opening, the second duct wall engages the first rim portion such that the rim obstructs movement of the second duct in the installation direction, and extends over the second rim portion.

2. The duct system of claim 1, further comprising a first duct opening seal disposed around a perimeter of the first duct opening at the rim along the first rim portion and the second rim portion, and disposed between the first duct and the second duct in the axial direction of the first duct opening such that the first duct and the second duct are sealed in fluid communication with each other across the first duct opening seal.

3. The duct system of claim 2, wherein the first duct wall includes a ridge extending in the axial direction of the first duct opening, and the first duct opening seal is disposed between the second rim portion and the ridge in the lateral direction of the first duct opening, and
   wherein the second duct wall includes a lip with a first lip portion having a first section extending in the lateral direction of the first duct opening, and a second section extending in the axial direction of the first duct opening, the first duct opening seal being disposed between the first section and the first duct in the axial direction of the first duct opening and disposed between the second section and the first rim portion in the lateral direction of the first duct opening.

4. The duct system of claim 2, wherein the first rim portion extends from an upper first duct portion and the second rim portion extends from a lower first duct portion sealed with the upper first duct portion to form the conduit configured for conveying fluid through the first duct opening, and the first duct opening seal is disposed along and between the first rim portion and the second rim portion around the perimeter of the first duct opening.

5. The duct system of claim 1, wherein the first duct wall includes an upper first duct wall portion and a lower first duct wall portion forming a path sealed with the upper first duct portion to form the conduit configured for conveying fluid through the first duct opening, wherein the upper first duct wall portion and the lower first duct wall portion are spaced from each other along the first duct wall to define a path therebetween, the path being configured for guiding water, snow, and debris away from an interior of the first duct.

6. The duct system of claim 5, further comprising a path seal disposed between the upper first duct portion and the lower first duct portion in the axial direction of the first duct opening, and disposed along the path such that the path seal is interposed between and separates the interior of the first duct and the path, sealing the path from the interior of the first duct.

7. The duct system of claim 1, further comprising a hook extended from the first duct and configured for receiving the second duct in the installation direction, and configured for obstructing movement of the second duct in the axial direction of the first duct opening when the second duct is installed on the first duct and received in the hook.

8. The duct system of claim 7, further comprising a fastener fixing the first duct with the second duct, pressing the first duct against the second duct in the axial direction of the first duct opening at a side of the first duct opening opposite the first hook in the lateral direction of the first duct opening.

9. The duct system of claim 1 in combination with an air intake system for a vehicle, wherein the axial direction of the first duct at the first opening is oriented along a height direction of the vehicle, and the second duct is installed on the first duct along a direction perpendicular to the height direction of the vehicle.

10. A duct system for an air intake system for a vehicle, the duct system comprising:
  a first duct including a first duct wall that defines a first duct opening and forms a conduit configured for conveying fluid through the first duct opening in an axial direction of the first duct opening, at least one contact surface provided on opposite sides of the first duct wall located across the first duct opening in a lateral direction of the first duct opening perpendicular to the axial direction of the first duct opening; and
  a second duct including a second duct wall that defines a second duct opening in fluid communication with the first duct opening, and forms a conduit configured for conveying fluid through the second duct opening,
  wherein the at least one contact surface is positioned such that when the second duct is installed on the first duct along the lateral direction of the first duct opening, the at least one contact surface engages with and seals against the second duct wall at the opposite sides of the first duct wall located across the first duct opening in the lateral direction of the first duct opening.

11. The duct system of claim 10, wherein the at least one contact surface extends in the lateral direction of the first duct opening such that when the second duct is installed on the first duct along the lateral direction of the first duct opening, the at least one contact surface engages with and seals against the second duct wall in the axial direction of the first duct opening.

12. The duct system of claim 10, wherein the first duct wall includes a shoulder that forms the at least one contact surface, and includes a rim that extends from the shoulder along the axial direction of the first duct opening, wherein the rim defines the first duct opening,
  wherein at least one seal is disposed on the shoulder along the at least one contact surface and the rim such that when the second duct is installed on the first duct in the lateral direction of the first duct opening, the at least one contact surface engages with and seals against the second duct wall through the at least one seal, and the rim retains the at least one seal with the second duct in the lateral direction of the first duct opening.

13. The duct system of claim 12, wherein the second duct wall includes a lip with a first section extending in the lateral direction of the first duct opening, and a second section extending in the axial direction of the first duct opening, the at least one seal being disposed along the shoulder between the first section and the at least one contact surface in the axial direction of the first duct opening, and between the second section and the rim in the lateral direction of the first duct opening.

14. The duct system of claim 10, further comprising at least one seal disposed along the at least one contact surface, wherein the at least one contact surface is engaged with and sealed against the second wall through the at least one seal.

15. The duct system of claim 14, wherein the at least one seal is compressed between the first duct wall and the second duct wall in at least one of the axial direction of the first duct opening and the lateral direction of the first duct opening when the second duct is installed on the first duct, sealing the first duct wall with the second duct wall.

16. The duct system of claim 10, wherein when the second duct is installed on the first duct, the second duct is removably pressed on the first duct in an installation direction oriented along the lateral direction of the first duct opening, and
  wherein the first duct includes a tab extended from the first duct wall and configured to obstruct movement of the second duct in at least one of the installation direction and the axial direction of the first duct opening when the first contact surface and the second contact surface are engaged with and sealed against the second duct.

17. A duct system for an air intake system for a vehicle, the duct system comprising:
  a first duct including a first duct wall that forms a rim defining a first duct opening, and forms a conduit configured for conveying fluid through the first duct opening in an axial direction of the first duct opening, wherein at least one contact surface is provided on opposite sides of the first duct wall located across the first duct opening in a lateral direction of the first duct opening perpendicular to the axial direction of the first duct opening; and
  a second duct including a second duct wall that defines a second duct opening in fluid communication with the first duct opening, and forms a conduit configured for conveying fluid through the second duct opening,
  wherein the rim at the at least one contact surface extends in the axial direction of the first duct opening from the first duct toward the second duct such that when the second duct is installed on the first duct along the lateral direction of the first duct opening, the at least one contact surface engages with and seals against the second duct wall.

18. The duct system of claim 17, wherein the at least one contact surface extends in the lateral direction of the first duct opening, and seals against the second duct in the axial direction of the first duct opening when the second duct is installed on the first duct in the lateral direction of the first duct opening.

19. The duct system of claim 17, further comprising:
  at least one seal disposed along the at least one contact surface, where the at least one contact surface is engaged with and sealed against the second duct wall through the at least one seal such that the at least one seal is compressed between the at least one contact surface and the second duct wall in the axial direction of the first duct opening, and the at least one seal is retained between the rim and the second duct wall in the lateral direction of the first duct opening.

20. The duct system of claim 17, wherein the second duct wall includes a lip that extends in the lateral direction of the first duct opening, and the first duct wall is sealed against the second duct wall through the first seal such that the first seal is compressed in the axial direction of the first duct opening between the first duct wall and the lip.

* * * * *